(12) United States Patent
Discekici et al.

(10) Patent No.: US 12,091,566 B2
(45) Date of Patent: Sep. 17, 2024

(54) HYDROGEL THREE-DIMENSIONAL PRINTING

(71) Applicant: Hewlett-Packard Development Company, L.P., Spring, TX (US)

(72) Inventors: Emre Hiro Discekici, San Diego, CA (US); Shannon Reuben Woodruff, San Diego, CA (US); Jacob Wright, San Diego, CA (US); Graciela Emma Negri Jimenez, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 212 days.

(21) Appl. No.: 17/799,699

(22) PCT Filed: Mar. 4, 2020

(86) PCT No.: PCT/US2020/020884
§ 371 (c)(1),
(2) Date: Aug. 15, 2022

(87) PCT Pub. No.: WO2021/177950
PCT Pub. Date: Sep. 10, 2021

(65) Prior Publication Data
US 2023/0081448 A1 Mar. 16, 2023

(51) Int. Cl.
*B29C 64/165* (2017.01)
*B33Y 10/00* (2015.01)
(Continued)

(52) U.S. Cl.
CPC ............ *C09D 11/38* (2013.01); *B29C 64/165* (2017.08); *B33Y 10/00* (2014.12); *B33Y 70/00* (2014.12);
(Continued)

(58) Field of Classification Search
None
See application file for complete search history.

(56) References Cited

U.S. PATENT DOCUMENTS

| 10,173,357 B2 * | 1/2019 | Rutz ................ A61L 27/38 |
| 2005/0059757 A1 | 3/2005 | Bredt et al. |

(Continued)

FOREIGN PATENT DOCUMENTS

| RU | 2015 144535 A | * | 3/2016 |
| RU | 2606041 C2 | | 1/2017 |

(Continued)

OTHER PUBLICATIONS

Hinton, Thomas J et al.; "Three-dimensional printing of complex biological structures by freeform reversible embedding of suspended hydrogels": Sci. Adv. Oct. 23, 2015; 1(9) e1500758 (Year: 2015).*
Hinton T. J., et al., "Three-dimensional printing of complex biological structures by freeform reversible embedding of suspended hydrogels," Science Advances, 2015, vol. 1, Issue 9, 17 pages.

*Primary Examiner* — Mohammad M Ameen
(74) *Attorney, Agent, or Firm* — HP Inc. Patent Department

(57) ABSTRACT

This disclosure describes hydrogel three-dimensional printing kits, methods of three-dimensional printing hydrogels, and hydrogel three-dimensional printing systems. In one example, a hydrogel three-dimensional printing kit can include a particulate build material, a crosslinking agent, a whitening agent, and a coloring agent. The particulate build material can include a polyhydroxylated swellable polymer. The crosslinking agent can include water and a crosslinker that is reactive with hydroxyl groups of the polyhydroxylated swellable polymer to crosslink the polyhydroxylated swellable polymer. The whitening agent can include water and a dispersed white pigment. The coloring agent can include water and a colorant.

15 Claims, 4 Drawing Sheets

(51) Int. Cl.
*B33Y 70/00* (2020.01)
*C09D 11/033* (2014.01)
*C09D 11/037* (2014.01)
*C09D 11/106* (2014.01)
*C09D 11/322* (2014.01)
*C09D 11/38* (2014.01)
*B29K 105/00* (2006.01)
*B29K 105/24* (2006.01)

(52) U.S. Cl.
CPC .......... *C09D 11/033* (2013.01); *C09D 11/037* (2013.01); *C09D 11/106* (2013.01); *C09D 11/322* (2013.01); *B29K 2105/0032* (2013.01); *B29K 2105/24* (2013.01); *B29K 2105/251* (2013.01)

(56) References Cited

U.S. PATENT DOCUMENTS

| | | | |
|---|---|---|---|
| 2007/0241482 A1* | 10/2007 | Giller | B29C 64/165 264/494 |
| 2011/0212501 A1 | 9/2011 | Yoo | |
| 2012/0045743 A1 | 2/2012 | Okano et al. | |

FOREIGN PATENT DOCUMENTS

| | | |
|---|---|---|
| WO | WO-2004 113042 A2 * | 12/2004 |
| WO | WO-2017 153947 A1 * | 9/2017 |
| WO | 2018/221749 A1 | 12/2018 |
| WO | 2019/039473 A1 | 2/2019 |

* cited by examiner

HYDROGEL THREE-DIMENSIONAL PRINTING

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited. Various materials can be unsuitable for use with certain three-dimensional printing processes. Due to the number of variables involved in three-dimensional printing with new materials, it can be difficult to design three-dimensional printing processes capable of three-dimensional printing with new materials while also providing print accuracy and maintaining the desired material properties in three-dimensional printed objects.

DETAILED DESCRIPTION

Figure 1:
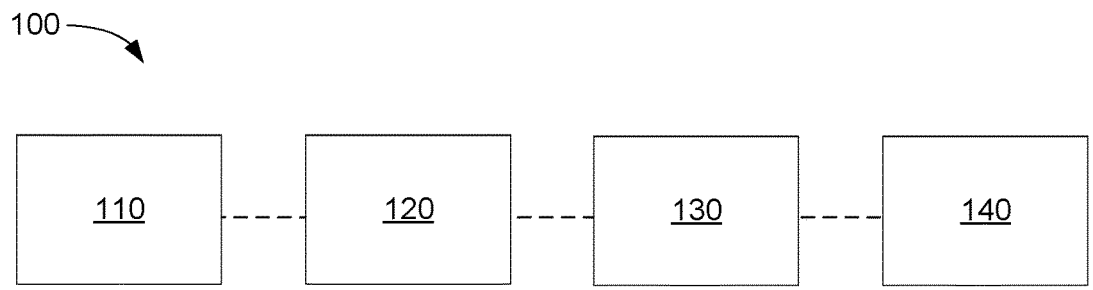
FIG. 1 is a schematic view of an example hydrogel three-dimensional printing kit in accordance with examples of the present disclosure.

The present disclosure describes hydrogel three-dimensional printing kits, methods of three-dimensional printing hydrogels, and hydrogel three-dimensional printing systems. For example, the printing kits, methods, and systems can be used to generate colored hydrogels. In one example, a hydrogel three-dimensional printing kit includes a particulate build material, a crosslinking agent, a whitening agent, and a coloring agent. The particulate build material includes a polyhydroxylated swellable polymer. The crosslinking agent includes water and a crosslinker that is reactive with hydroxyl groups of the polyhydroxylated swellable polymer to crosslink the polyhydroxylated swellable polymer. The whitening agent includes water and a dispersed white pigment. The coloring agent includes water and a colorant. In certain examples, the whitening agent and the coloring agent can also include the crosslinker. In further examples, the colorant can be a black dye, a cyan dye, a magenta dye, a yellow dye, a red dye, a blue dye, a green dye, a violet dye, an orange dye, a brown dye, or a combination thereof. In other examples, the white pigment can include titanium dioxide. In some examples, the particulate build material can be devoid of pigment. In further examples, the polyhydroxylated swellable polymer can include polyvinyl alcohol, cellulose, gelatin, alginate, chitosan, poly(2-hydroxyethyl acrylate), poly(2-hydroxyethyl methacrylate), poly(acrylic acid), poly(methacrylic acid), poly(N,N-dimethylacrylamide), poly(N,N-diethylacrylamide), poly(N-isopropylacrylamide), or a combination thereof. In other examples, the crosslinker can include boric acid, a boric acid salt, citric acid, a citric acid salt, succinic acid, a succinic acid salt, cationic calcium, cationic barium, or a combination thereof.

The present disclosure also describes methods of three-dimensional printing hydrogels. In one example, a method of three-dimensional printing a hydrogel includes iteratively applying individual layers of a particulate build material to a powder bed. The particulate build material includes a polyhydroxylated swellable polymer. A crosslinking agent is iteratively and selectively applied onto the individual layers based on a three-dimensional object model. The crosslinking agent includes water and a crosslinker. The water swells the polyhydroxylated swellable polymer and the crosslinker reacts with hydroxyl groups of the polyhydroxylated swellable polymer to crosslink the polyhydroxylated swellable polymer, thereby forming a three-dimensional printed hydrogel. A whitening agent is also iteratively and selectively applied onto the individual layers. The whitening agent includes water and a dispersed white pigment. A coloring agent is also iteratively and selectively applied onto the individual layers. The coloring agent includes water and a colorant. In some examples, the particulate build material can be at a temperature from about 0° C. to about 75° C. during three-dimensional printing of the hydrogel. In other examples, the three-dimensional printed hydrogel can include a white surface area including the white pigment, wherein the white surface area has an L* value from about 85 to about 100. In further examples, the colorant can be a black dye, wherein the three-dimensional printed hydrogel includes a black surface area including the black dye, wherein the black surface area has an L* value from about 0 to about 20.

The present disclosure also describes hydrogel three-dimensional printing systems. In one example, a hydrogel three-dimensional printing system includes a particulate build material, a crosslinking agent applicator, a whitening agent applicator, and a coloring agent applicator. The particulate build material includes a polyhydroxylated swellable polymer. The crosslinking agent applicator is fluidly coupled or coupleable to a crosslinking agent, and the crosslinking agent applicator is directable to iteratively apply the crosslinking agent to layers of the particulate build material. The crosslinking agent includes water to swell the polyhydroxylated swellable polymer and a crosslinker that is reactive to crosslink hydroxyl groups of the polyhydroxylated swellable polymer. The whitening agent applicator is fluidly coupled or coupleable to a whitening agent, and the whitening agent applicator is directable to iteratively apply the whitening agent to layers of the particulate build material. The whitening agent includes water and a dispersed white pigment. The coloring agent applicator is fluidly coupled or coupleable to a coloring agent, and the coloring agent applicator is directable to iteratively apply the coloring agent to layers of the particulate build material. The coloring agent includes water and a colorant. In certain examples, the white pigment can include titanium dioxide and the colorant can be a black dye, a cyan dye, a magenta dye, a yellow dye, a red dye, a blue dye, a green dye, a violet dye, an orange dye, a brown dye, or a combination thereof. In further examples, the polyhydroxylated swellable polymer can include polyvinyl alcohol, cellulose, gelatin, alginate, chitosan, poly(2-hydroxyethyl acrylate), poly(2-hydroxyethyl methacrylate), poly(acrylic acid), poly(methacrylic acid), poly(N,N-dimethylacrylamide), poly(N,N-diethylacrylamide), poly(N-isopropylacrylamide), or a combination thereof and the crosslinker can include boric acid, a boric acid salt, citric acid, a citric acid salt, succinic acid, a succinic acid salt, cationic calcium, cationic barium, or a combination thereof. In other examples, the particulate build material can be devoid of pigment.

It is noted that when discussing the hydrogel three-dimensional printing kits, methods, and systems herein, these discussions can be considered applicable to one another whether or not they are explicitly discussed in the context of that example. Thus, for example, when discussing a crosslinking agent related to a three-dimensional printing kit, such disclosure is also relevant to and directly supported in the context of methods and systems, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Hydrogel Three-dimensional Printing Kits

The three-dimensional printing kits, methods, and systems described herein can be used to make three-dimensional printed hydrogels. Hydrogels are a material made up of a network of hydrophilic polymer chains permeated by a relatively large amount of water. The polymer network can maintain its structure while holding the water, thus forming a gel. In various examples, water can make up 10 wt % or more of the hydrogel. In some examples, hydrogels can include water in an amount from about 50 wt % to about 95 wt % or more. The high water content and flexible nature of the polymer network can allow the hydrogel to be flexible. The degree of flexibility of the hydrogel can depend on variables such as the water content of the hydrogel, the properties of the polymer, degree of crosslinking of the polymer, and others.

Hydrogels have many applications in the field of life sciences. Scaffolds for tissue engineering can be made from hydrogels. The high water content of the hydrogel can provide a suitable environment for living cells. In certain examples, the methods described herein can be performed at temperatures that can be suitable for living cells, such as near normal body temperature. Accordingly, these methods can be used for applications in which living cells may be present during the three-dimensional printing process. Hydrogels can also be used as a medium for cell culture. Additionally, hydrogels can be injectable or implantable and may be used to deliver drugs or help with tissue regeneration. Hydrogels can also be used for a variety of other applications related to life sciences or in other non-related fields.

The hydrogels formed using the three-dimensional printing kits, methods, and systems described herein can be crosslinked. In some examples, the hydrogels can be formed using a layer-by-layer process in which individual layers of polymer particles are crosslinked by applying a crosslinking agent. A layer of dry polymer particles can be spread in a powder bed and then a liquid crosslinking agent can be applied to the powder bed. In certain examples, the crosslinking agent can be applied using a fluid ejector similar to an inkjet printhead. The crosslinking agent can be applied precisely with high resolution to certain areas of the powder bed. The polymer particles that contact the crosslinking agent can become crosslinking together. At the same time, the polymer particles can absorb water from the crosslinking agent. This can cause the crosslinked polymer to swell and become a hydrogel. Additional layers of dry polymer particles can be spread on the powder bed, and additional crosslinking agents can be applied to form more crosslinked layers of hydrogel. The individual layers can have shapes corresponding to layers or slices of a three-dimensional object model. Multiple layers can be formed using this process, and the crosslinking agent can cause the individual layers to crosslink together, forming a continuous hydrogel matrix. In this way, a hydrogel object can be formed having any desired three-dimensional shape. Once the three-dimensional hydrogel object is complete, the object can be removed from the powder bed. Any stray dry polymer particles on the surface of the object can be removed by rinsing, scrubbing, or another method. In certain examples, the polymer powder can be water soluble and therefore easily removed by rinsing the hydrogel object in water.

The hydrogels made using the three-dimensional printing kits, methods, and systems described herein can also be colored using coloring agents to produce a wide gamut of possible colors. For example, coloring agents can be selectively applied during three-dimensional printing so that any desired combination of colors can be present in any portion of the three-dimensional printed hydrogel. In certain examples, a whitening agent can also be applied to increase the opacity of the hydrogel and/or provide lighter colors. The hydrogel can naturally be translucent and colorless in some cases. Thus, the whitening agent and coloring agents can be selectively applied to produce a range of translucent and opaque colors. These materials can provide better, more saturated colors and wider color gamut compared to some previous three-dimensional printing technologies. For example, some three-dimensional printing processes can use a particulate build material that may not be translucent or colorless, and thus the range of colors achievable in three-dimensional printed objects can be limited by the particulate build material. Further, some three-dimensional printing processes can involve a fusing agent that is applied to a particulate build material, and the fusing agent may have a visible color. The color gamut of the final three-dimensional printed object can be limited by the color of the fusing agent as well. Additionally, certain three-dimensional printing processes involve fusing polymer particles at high temperature. In such processes, the amount of fluid agents, such as coloring agents, that can be applied may be limited because excessive amounts of fluid agents can reduce the temperature of the polymer particles and interfere with fusing of the polymer particles. Therefore, the final colors may not be sufficiently vibrant because the amount of coloring agent that can be used is limited. Many dyes are also not stable at the high temperatures used to fuse polymer particles. If dyes are used as a colorant, then the dyes may fade or change color when exposed to the high temperatures. This can limit the types of colorants that can be used in such high-temperature processes.

In contrast, the three-dimensional printing processes described herein involve a particulate build material that can be transparent and colorless, as well as a crosslinking agent that can be transparent and colorless. Thus, if desired, the final three-dimensional printed hydrogel can be transparent and colorless. A whitening agent and coloring agents can also be applied to make any portion of the hydrogel have a desired opacity and a desired color. The hydrogels can also be printed at relatively low temperatures, as the crosslinking process does not rely on high temperatures that melt or fuse the particulate build material. Therefore, any amount of the coloring agents can be applied without changing the temperature of the particulate build material in any way that interferes with three-dimensional printing. Vibrant and highly saturated colors can be achieved by applying a sufficient amount of the coloring agents.

With this description in mind, FIG. 1 shows a schematic illustration of an example hydrogel three-dimensional printing kit 100. The kit includes a particulate build material 110, a crosslinking agent 120, a whitening agent 130, and a coloring agent 140. The particulate build material includes a polyhydroxylated swellable polymer. The crosslinking agent includes water and a crosslinker that is reactive with hydroxyl groups of the polyhydroxylated swellable polymer to crosslink the polyhydroxylated swellable polymer. The whitening agent includes water and a dispersed white pigment. The coloring agent includes water and a colorant.

In various examples, the polyhydroxylated swellable polymer can include a variety of polymers that are water absorbent and that include multiple hydroxyl groups. Specifically, "polyhydroxylated" can refer to polymers that include two or more hydroxyl groups per polymer strand. The hydroxyl groups can allow the crosslinker in the crosslinking agent to crosslink different polymer strands together. In various examples, the polymer can include any number of hydroxyl groups provided that there are two or more per strand. In certain examples, the polymer can have from 2 to 20,000 hydroxyl groups per polymer strand.

As used herein, "swellable" refers to polymers that can absorb water. Accordingly, the swellable polymers can be sufficiently hydrophilic that the dry polymer can absorb water. Additionally, swellable polymers can have or form a polymer network that can absorb and hold water without becoming fully dissolved by the water. In some examples, such a polymer network can be formed by crosslinking individual polymer strands. In some examples, the polymer can begin as a water-soluble polymer and the polymer can be crosslinked by the crosslinking agent during three-dimensional printing. Accordingly, swellable polymers as described herein can be non-crosslinked and water-soluble at the beginning of the three-dimensional printing process. The polymer can become crosslinked when the crosslinking agent is applied and this can allow the crosslinked polymer to hold water without the crosslinked structure dissolving in the water. In other examples, the swellable polymer can have some degree of crosslinking to begin with. For example, the polymer can be lightly crosslinked or partially crosslinked. Then, when the crosslinking agent is applied to the polymer, additional crosslinking can form so that the individual polymer particles are crosslinked together to form a larger crosslinked structure. As mentioned above, one characteristic of hydrogels is the ability to absorb and hold water without the polymer structure being dissolved in the water.

Non-limiting examples of polyhydroxylated swellable polymers can include polyvinyl alcohol, cellulose, gelatin, alginate, chitosan, poly(2-hydroxyethyl acrylate), poly(2-hydroxyethyl methacrylate), poly(acrylic acid), poly(methacrylic acid), poly(N,N-dimethylacrylamide), poly(N,N-diethylacrylamide), poly(N-isopropylacrylamide), and combinations thereof. In some examples, the particulate build material can include one of these polyhydroxylated swellable polymers or a combination of multiple such polymers. In other examples, the particulate build material can include a combination of polyhydroxylated swellable polymer and an additional polymer. For example, individual particles of the particulate build material can be a blend of polyhydroxylated swellable polymer and an addition polymer. In certain examples, the individual particles can include from about 90 wt % to 100 wt % polyhydroxylated swellable polymer.

The polyhydroxylated swellable polymer can have any suitable molecular weight, provided that the polymer includes polymer strands having multiple hydroxyl groups. In certain examples, the polyhydroxylated swellable polymer can have a weight average molecular weight from about 1,000 Mw to about 500,000 Mw. In other examples, the molecular weight can be from about 10,000 Mw to about 300,000 Mw or from about 20,000 Mw to about 200,000 Mw. In certain examples, the polyhydroxylated swellable polymer can be polyvinyl alcohol having a molecular weight from about 1,000 Mw to about 500,000 Mw, or from about 10,000 Mw to about 300,000 Mw, or from about 20,000 Mw to about 200,000 Mw.

The particulate build material can include polymer particles having a variety of shapes, such as substantially spherical particles or irregularly-shaped particles. In some examples, the polymer particles can be capable of being formed into three-dimensional printed objects with a resolution of about 20 μm to about 1000 μm, about 30 μm to about 800 μm, or about 40 μm to about 600 μm. As used herein, "resolution" refers to the size of the smallest feature that can be formed on a three-dimensional printed object. The particulate build material can form layers from about 20 μm to about 600 μm thick, allowing the fused layers of the printed part to have roughly the same thickness. In some examples, the layer thickness can also change when the crosslinking agent is applied to the particulate build material because the polymer of the particulate build material can absorb water and swell to an increased volume. In some examples, the overall resolution in the z-axis (i.e., depth) direction, based on the layer height of the dry polymer particles and/or the layer height when the polymer particles absorb water, can be about 20 μm to about 600 μm. The particulate build material can also have a sufficiently small particle size and sufficiently regular particle shape to provide about 20 μm to about 600 μm resolution along the x-axis and y-axis (i.e., the axes parallel to the top surface of the powder bed). For example, the particulate build material can have an average particle size from about 20 μm to about 600 μm. In other examples, the average particle size can be from about 20 μm to about 500 μm. Other resolutions along these axes can be from about 30 μm to about 400 μm or from 40 μm to about 300 μm. In further examples, the particulate build material can have a D50 particle size from about 20 μm to about 600 μm, or from about 20 μm to about 500 μm, or from about 100 μm to about 300 μm. Additionally, the particulate build material can have a D90 particle size from about 100 μm to about 800 μm, or from about 200 μm to about 600 μm, or from about 300 μm to about 500 μm, in some examples. The D50 particle size is defined as the diameter threshold at which 50% of the particles have a diameter below the threshold. Similarly, D90 particle size is defined as the diameter threshold at which 90% of the particles have a diameter below the threshold.

The particulate build material can also in some cases include a filler. The filler can include inorganic particles such as alumina, silica, fibers, carbon nanotubes, or combinations thereof. When the swellable polymer particles become crosslinked together during three-dimensional printing, the filler particles can become embedded in the crosslinked polymer network, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of swellable polymer particles to filler particles can be from about 1,000:1 to about 90:10. In other examples, the particulate build material can be devoid of fillers. In certain examples, the particulate build material can include from about 90 wt % to 100 wt % of the swellable polymer particles, or from about 95 wt % to 100 wt % of the swellable polymer particles, or from about 99 wt % to 100 wt % of the swellable polymer particles.

In some examples, the polyhydroxylated swellable polymer can be colorless and/or translucent. As used herein, "translucent" can refer to a material that transmits visible light. In some examples, the translucent polymer can transmit from about 50% to 100% of visible light. In further examples, the particulate build material can consist of the polyhydroxylated swellable polymer. In other examples, the particulate build material can include additional particulate materials that are also colorless and/or translucent. Thus, the particulate build material as a whole can be colorless or translucent. In certain examples, the particulate build material can be devoid of colorants or opacifying agents. In a particular example, the particulate build material can be devoid of white pigment. In some other three-dimensional printing processes, white pigment can be included in the particulate build material to increase opacity and whiteness of the material. However, this can limit the range of colors that can be achieved using such particulate build material. For example, a dark black color may not be achievable using such a particulate build material because the white pigment present in the build material would lighten the color. In contrast, some examples of the present disclosure can allow for dark black or vivid, saturated colors because the particulate build material can be devoid of white colorant.

Turning now to the crosslinking agent, in some examples the crosslinking agent can include water and a crosslinker that is reactive with hydroxyl groups of the polyhydroxylated swellable polymer to crosslink the polyhydroxylated swellable polymer. In certain examples, the crosslinker can form hydrogen bonds with the hydroxyl groups of the polyhydroxylated swellable polymer. Thus, "reactive with" includes the capability of forming hydrogen bonds with the hydroxyl groups. In further examples, the crosslinker may react with the hydroxyl groups in other ways, such as by forming covalent bonds, ionic crosslinking, and so on.

A variety of crosslinker compounds can be suitable for crosslinking polyhydroxylated polymers. In certain examples, the crosslinker used in the crosslinker agent can be boric acid, citric acid, succinic acid, cationic calcium, cationic barium, or a combination thereof. These examples can also include salt forms of the crosslinker compounds, such as halide salts of acid crosslinkers and cationic ionic crosslinkers. For example, sodium tetraborate can be an alternative compound for boric acid. Other salt forms of crosslinker compounds can also be used. Some crosslinker compounds can be water-soluble. These crosslinkers can be dissolved in the crosslinking agent. In further examples, the crosslinking agent can include a liquid vehicle that includes water and an organic solvent. In some such examples, the crosslinker compound can be soluble in the liquid vehicle of the crosslinking agent. In alternative examples, crosslinkers can be dispersed in the crosslinking agent if the crosslinkers are not soluble.

As used herein, "water-soluble" refers to materials that can be dissolved in water at a concentration from about 3 wt % to about 99 wt % of the dissolved material with respect to the entire weight of the solution. The solution of a water-soluble material can be fully transparent without any phase separation. Materials that are not water-soluble can be referred to as "water-insoluble."

The crosslinker concentration in the crosslinking agent can be adjusted to provide a suitable degree of crosslinking in the three-dimensional printed hydrogel. In some examples, the concentration can also be within a range that provides good jettability when the crosslinking agent is jetted from fluid ejectors during three-dimensional printing. In certain examples, the concentration of crosslinker in the crosslinking agent can be from about 0.1 wt % to about 50 wt % based on the total weight of the crosslinking agent. In further examples, the concentration can be from about 0.5 wt % to about 25 wt % or from about 1 wt % to about 20 wt %. Using a higher concentration of crosslinker can result in a relatively higher degree of crosslinking in the three-dimensional printed hydrogel. This can affect the properties of the hydrogel. For example, hydrogels with a higher degree of crosslinking can have greater mechanical strength and can be more rigid. Hydrogels with a lower degree of crosslinking can be weaker and more flexible.

Figure 2:
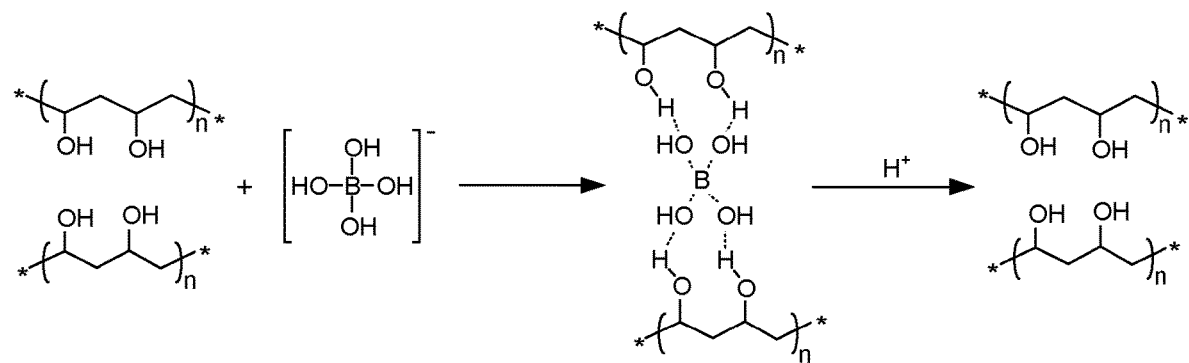
FIG. 2 a schematic illustration of a crosslinking reaction of a borate ion with polyvinyl alcohol polymer strands in accordance with examples of the present disclosure.

In a particular example, the crosslinker can include boric acid or a borate salt, and the polyhydroxylated swellable polymer of the particulate build material can include polyvinyl alcohol. In a particular example, the crosslinker can be sodium tetraborate. When dissolved in the crosslinking agent, the sodium tetraborate can form tetrahedral borate ions, which can crosslink polyvinyl alcohol by forming hydrogen bonds with hydroxyl groups of the polyvinyl alcohol. A mechanism for crosslinking polyvinyl alcohol using tetrahedral borate ions is shown in FIG. 2. The crosslinking can also be reversed, in some examples, by exposing the polymer to an acidic pH. This degradation process is also shown in FIG. 2.

In some examples, the crosslinking agent can be jetted onto the particulate build material using a fluid jetting device, such as inkjet printing architecture. Accordingly, in some examples, the crosslinking agent can be formulated to give the crosslinking agent good jetting performance. Ingredients that can be included in the crosslinking agent to provide good jetting performance can include a liquid vehicle. Thermal jetting can function by heating the crosslinking agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

Classes of co-solvents that can be used can include organic co-solvents including aliphatic alcohols, aromatic alcohols, diols, glycols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, propylene glycol, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the crosslinking agent may range from about 0.01 wt % to about 20 wt %. Suitable surfactants can include, but are not limited to, liponic esters such as TERGITOL™ 15-S-12, TERGITOL™ 15-S-7 available from Dow Chemical Company (Michigan), LEG-1 and LEG-7; TRITON™ X-100; TRITON™ X-405 available from Dow Chemical Company (Michigan); and sodium dodecylsulfate.

Various other additives can be employed to enhance certain properties of the crosslinking agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

In many examples, the crosslinking agent can be devoid of a polymeric binder or substantially devoid of a polymeric binder. Unlike two-dimensional printing inks, which often include a polymeric binder to bind colorants to a print substrate, the crosslinking agents described herein can be designed for three-dimensional printing. In particular, the crosslinking agents can be designed to apply to swellable polymer build material. Thus, the crosslinking agents can function well in the three-dimensional printing process without any polymeric binder in the crosslinking agent. In some cases, certain polymers may be present in the crosslinking agent such as, for example, polymeric dispersants or polymers that perform other functions. However, in some examples the crosslinking agent can be devoid of polymeric binder and any other polymers present in the agent can be present in minimal amounts, such as less than about 1 wt %, or less than about 0.5 wt %, or less than about 0.1 wt %.

In certain examples, the crosslinking agent can include from about 0.1 wt % to about 50 wt % crosslinker, from about 1 wt % to about 50 wt % organic solvent, from about 0.1 wt % to about 20 wt % surfactant, and from about 50 wt % to about 98 wt % water. In further examples, the crosslinking agent can consist of a crosslinker and a liquid vehicle. In certain examples, the liquid vehicle can consist of water, an organic solvent, and a surfactant. In still further examples, the liquid vehicle can consist of water, water and an organic solvent, or water and a surfactant.

As mentioned above, coloring agents can also be used to impart a desired color to the three-dimensional printed hydrogel. The coloring agents can be separate fluid agents that are included in addition to the crosslinking agent. In some examples, the coloring agents can also include the crosslinker so that the coloring agents also act as crosslinking agents. Additionally, in some examples the crosslinking agent can include a colorant. A combination of multiple coloring agents and/or colored crosslinking agents can be used in certain examples. In other examples, the crosslinking agent can be colorless so that the final three-dimensional printed hydrogel can be colorless and/or translucent.

In various examples, coloring agents can include a colorant such as a dye or pigment. In certain examples, the colorant can include water soluble dyes such as black, cyan, magenta, yellow, red, blue, green, violet, orange, brown, or other colored dyes. It is noted that for purposes of the present disclosure, the use of a black colorant can be used to generate a "colored" hydrogel, even though black is often considered to be the absence of color. Black is considered to be a color in the present disclosure. Combinations of these dyes can also be used. In some examples, the dyes can be water-soluble. Dyes can include nonionic, cationic, anionic, or a mixture of nonionic, cationic, and/or anionic dyes. Specific examples of dyes that can be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (USA). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include ORASOL® Blue GN, ORASOL® Pink, and ORASOL® Yellow dyes available from Ciba-Geigy Corp. (Switzerland). Black dyes may include, but are not limited to, Direct Black 154, Direct Black 168, Fast Black 2, Direct Black 171, Direct Black 19, Acid Black 1, Acid Black 191, Mobay Black SP, and Acid Black 2. In certain examples a black coloring agent can include a Direct Black dye.

In further examples, the coloring agent can include a pigment colorant. Certain pigment colorants can be self-dispersed with a polymer, oligomer, or small molecule, or can be dispersed with a separate dispersant. Some examples of pigments include, but are not limited to, the following pigments available from BASF (Germany): PALIOGEN® Orange, HELIOGEN® Blue L 6901F, HELIOGEN® Blue NBD 7010, HELIOGEN® Blue K 7090, HELIOGEN® Blue L 7101F, PALIOGEN® Blue L 6470, HELIOGEN® Green K 8683, and HELIOGEN® Green L 9140. The following black pigments are available from Cabot (USA): MONARCH® 1400, MONARCH® 1300, MONARCH® 1100, MONARCH® 1000, MONARCH® 900, MONARCH® 880, MONARCH® 800, and MONARCH® 700. The following pigments are available from CIBA (Switzerland): CHROMOPHTAL® Yellow 3G, CHROMOPHTAL®

Yellow GR, CHROMOPHTAL® Yellow 8G, IGRAZIN® Yellow SGT, IGRALITE® Rubine 4BL, MONASTRAL® Magenta, MONASTRAL® Scarlet, MONASTRAL® Violet R, MONASTRAL® Red B, and MONASTRAL® Violet Maroon B. The following pigments are available from Degussa (Germany): PRINTEX® U, PRINTEX® V, PRINTEX® 140U, PRINTEX® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont (USA): TIPURE® R-101. The following pigments are available from Heubach (India): DALAMAR® Yellow YT-858-D and HEUCOPHTHAL® Blue G XBT-583D. The following pigments are available from Clariant (Switzerland): Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM® Yellow HR, NOVOPERM® Yellow FGL, Hansa Brilliant Yellow 10GX, Permanent Yellow G3R-01, HOSTAPERM® Yellow H4G, HOSTAPERM® Yellow H3G, HOSTAPERM® Orange GR, HOSTAPERM® Scarlet GO, and Permanent Rubine F6B. The following pigments are available from Mobay (USA): QUINDO® Magenta, INDOFAST® Brilliant Scarlet, QUINDO® Red R6700, QUINDO® Red R6713, and INDOFAST® Violet. The following pigments are available from Sun Chemical (USA): L74-1357 Yellow, L75-1331 Yellow, L75-2577 Yellow, and LHD9303 Black. The following pigments are available from Columbian (USA): RAVEN® 7000, RAVEN® 5750, RAVEN® 5250, RAVEN® 5000, and RAVEN® 3500.

In various examples, the coloring agent can include a colorant in an amount from about 0.05 wt % to about 20 wt %. In other examples, the colorant can be included in an amount from about 0.1 wt % to about 10 wt % or from about 0.5 wt % to about 5 wt %. The coloring agent can also include a liquid vehicle that includes any of the ingredients described above in the crosslinking agent to give the crosslinking agent good jettability. In certain examples, the coloring agent can also be jetted using a fluid jetting device. Accordingly, the coloring agent can include ingredients such as water, organic co-solvents, surfactants, dispersant, biocides, viscosity modifiers, materials for pH adjustment, sequestering agents, preservatives, and so on as described above.

In certain examples, the coloring agent can include from about 0.05 wt % to about 20 wt % of a colorant, from about 1 wt % to about 50 wt % organic solvent, from about 0.1 wt % to about 20 wt % surfactant, and from about 50 wt % to about 98 wt % water. In further examples, the coloring agent can consist of the colorant and a liquid vehicle. In certain examples, the liquid vehicle can consist of water, an organic solvent, and a surfactant. In still further examples, the liquid vehicle can consist of water, or water and an organic solvent, or water and a surfactant. In another example, the coloring agent can also include a crosslinker in addition to any of the above compositions.

A whitening agent can also be included in the hydrogel three-dimensional printing kit. The whitening agent can be applied during three-dimensional printing to increase whiteness and/or opacity of the areas of the hydrogel where the whitening agent is applied. In certain examples, the whitening agent can include a dispersed white pigment. Examples of white pigments can include titanium dioxide, zinc white, zinc sulfide, alumina, calcium carbonate, barium sulfate, talc, silica, and others. In a particular example, the white pigment can be titanium dioxide. In further examples, the white pigment can be self-dispersed or dispersed using a dispersant. In some examples, the dispersant can be any of the dispersants described above. Some dispersants can include poly(methacrylic acid) polymers and/or copolymers thereof. In further examples, the white pigment can have a particle size suitable for jetting, such as from about 100 nm to about 1 μm.

In some examples, the whitening agent can include the white pigment in an amount from about 0.05 wt % to about 20 wt %. In other examples, the white pigment can be included in an amount from about 0.1 wt % to about 10 wt % or from about 0.5 wt % to about 5 wt %. Similar to the coloring agents described above, the whitening agent can also include a liquid vehicle that includes any of the ingredients described above in the crosslinking agent to give the crosslinking agent good jettability. In certain examples, the whitening agent can also be jetted using a fluid jetting device. Accordingly, the whitening agent can include ingredients such as water, organic co-solvents, surfactants, dispersant, biocides, viscosity modifiers, materials for pH adjustment, sequestering agents, preservatives, and so on as described above.

In certain examples, the whitening agent can include from about 0.05 wt % to about 20 wt % of a white pigment, from about 1 wt % to about 50 wt % organic solvent, from about 0.1 wt % to about 20 wt % surfactant, and from about 50 wt % to about 98 wt % water. In further examples, the whitening agent can consist of the dispersed white pigment and a liquid vehicle. In certain examples, the liquid vehicle can consist of water, an organic solvent, and a surfactant. In still further examples, the liquid vehicle can consist of water, or water and an organic solvent, or water and a surfactant. In another example, the whitening agent can also include a crosslinker in addition to any of the above compositions.

Methods of Three-Dimensional Printing Hydrogels

Figure 3:
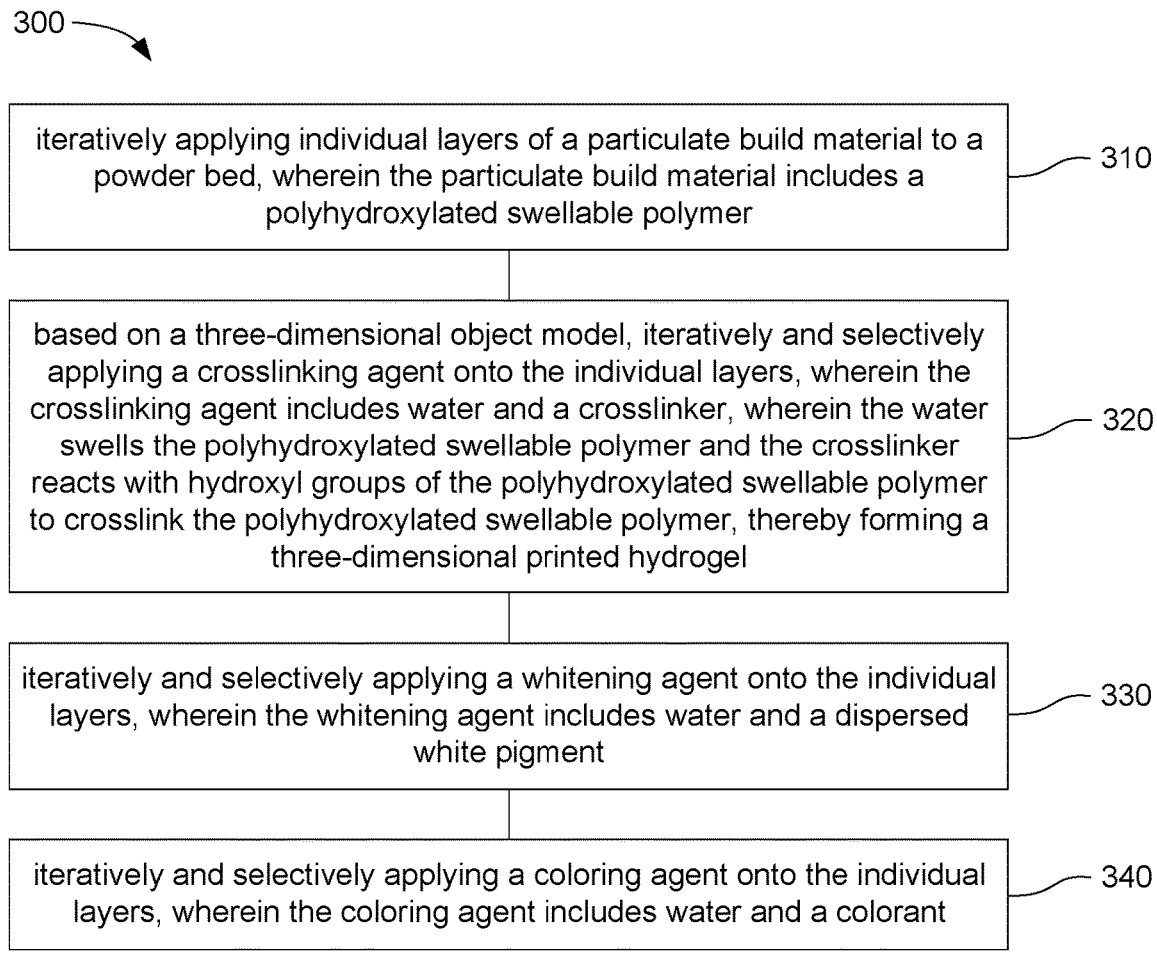
FIG. 3 is a flowchart of an example method of three-dimensional printing a hydrogel in accordance with examples of the present disclosure.

The present disclosure also describes methods of three-dimensional printing hydrogels. The materials described above in the hydrogel three-dimensional printing kits can be used in these methods. FIG. 3 shows a flowchart illustrating one example method 300 of three-dimensional printing a hydrogel. The method includes: iteratively applying individual layers of a particulate build material to a powder bed, wherein the particulate build material includes a polyhydroxylated swellable polymer 310; based on a three-dimensional object model, iteratively and selectively applying a crosslinking agent onto the individual layers, wherein the crosslinking agent includes water and a crosslinker, wherein the water swells the polyhydroxylated swellable polymer and the crosslinker reacts with hydroxyl groups of the polyhydroxylated swellable polymer to crosslink the polyhydroxylated swellable polymer, thereby forming a three-dimensional printed hydrogel 320; iteratively and selectively applying a whitening agent onto the individual layers, wherein the whitening agent includes water and a dispersed white pigment 330; and iteratively and selectively applying a coloring agent onto the individual layers, wherein the coloring agent includes water and a colorant 340.

Figure 4A:
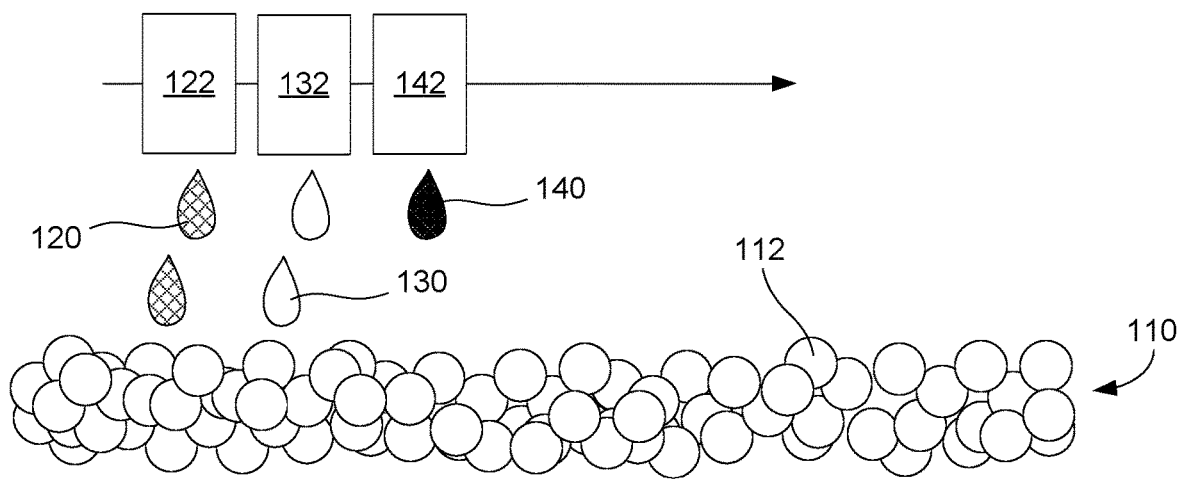
FIGS. 4A-4C show a schematic view of an example method of three-dimensional printing a hydrogel in accordance with examples of the present disclosure.
Figure 4B:
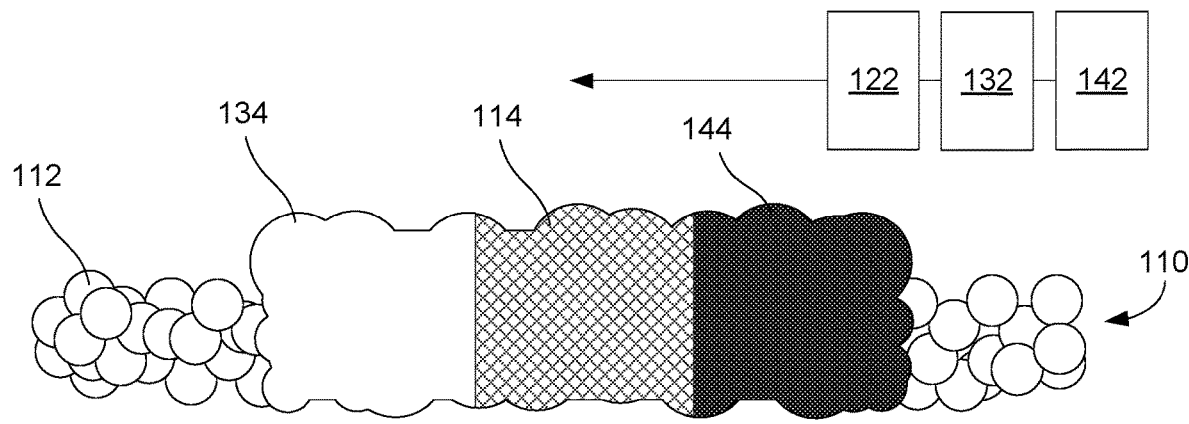
Figure 4C:
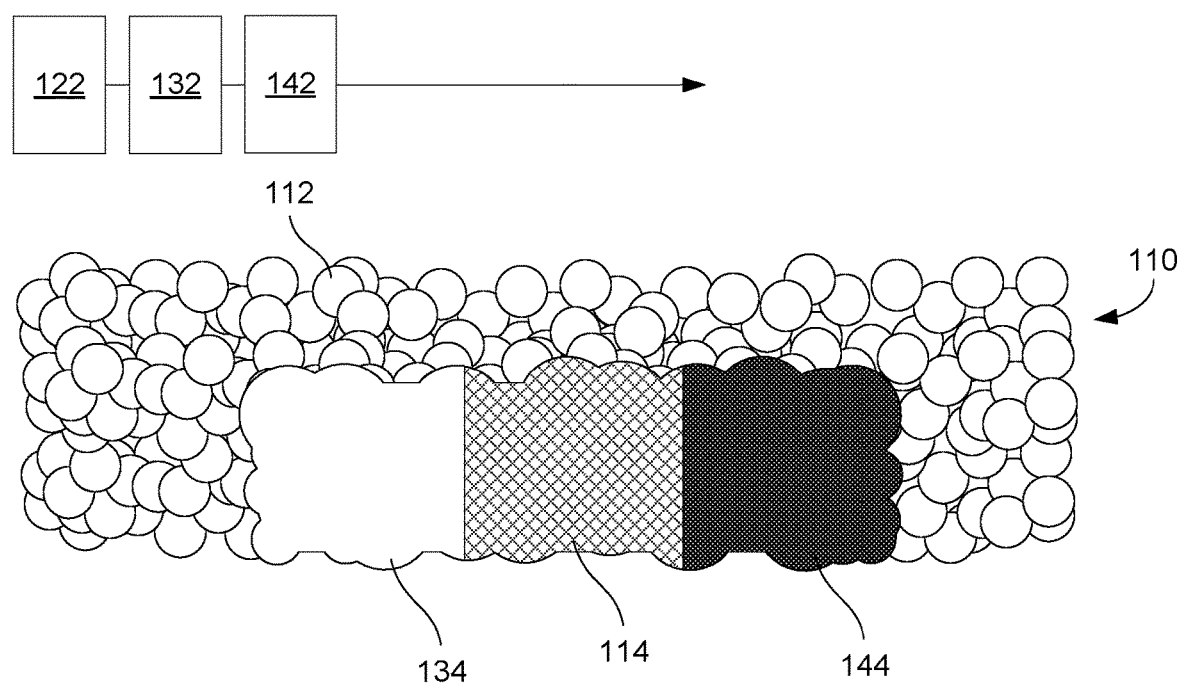

To further illustrate methods of three-dimensional printing hydrogels, FIGS. 4A-4C show one example method of three-dimensional printing a hydrogel using the hydrogel three-dimensional printing kits described above. In FIG. 4A, a crosslinking agent 120 is jetted onto a layer of particulate build material 110 made up of particles of a polyhydroxylated swellable polymer 112. The crosslinking agent is jetted from a crosslinking agent ejector 122. A whitening agent 130 is also jetted onto an area of the particulate build material using a whitening agent ejector 132. Similarly, a coloring agent 140 is jetted onto another area of the particulate build material using a coloring agent ejector 142. The crosslinking agent ejector, whitening agent ejector, and coloring agent ejector can move across the layer of particulate build material to selectively jet the respective agents on areas of the layer of particulate build material. The area where the crosslinking agent is jetted is the area to be crosslinked to become part of the final hydrogel. The whitening agent is jetted onto a portion of this area. The colored agent is jetted onto a portion where the color of the coloring agent is desired. In this example, the coloring agent and whitening agent are applied in different areas to form a white area and a colored area. However, in other examples, the coloring agent and whitening agent can be applied in overlapping areas or in the same area if an opaque color or a lightened color is desired. Furthermore, in this particular example, a single coloring agent is used. However, in other examples, any number of coloring agents can be used. For examples, multiple different coloring agents can be used to provide full-color printing in some examples.

FIG. 4B shows the layer of particulate build material 110 after the crosslinking agent, whitening agent, and coloring agent have been jetted onto the powder bed. The crosslinking agent has been jetted in an area of the particulate build material layer that is to be crosslinked to become part of the final three-dimensional printed hydrogel. The crosslinking agent converts the dry particulate build material into a crosslinked hydrogel 114. In this example, the polymer swells in the area where the crosslinking agent was jetted due to the polymer absorbing water from the crosslinking agent. As shown in the figure, this can result in a volume increase in the area where the crosslinking agent was jetted, where the hydrogel has a larger volume than the original volume of the layer of particulate build material. The whitening agent was jetted onto a portion of the area where the crosslinking agent was jetted, which forms a white hydrogel area 134. The coloring agent was jetted onto a different portion of the area where the crosslinking agent was jetted, forming a colored hydrogel area 144.

FIG. 4C shows an additional layer of particulate build material 110 spread over the top of the previous layer. The additional layer can have a sufficient layer thickness that some particulate build material covers the hydrogel formed in the previous layer. The process of jetting crosslinking agent onto the powder bed can then be repeated to form an area of hydrogel from the additional layer of particulate build material. The whitening agent and coloring agent can also be jetted onto the additional layer. The individual layers of hydrogel can correspond to layers or slices of the three-dimensional object that is to be formed of hydrogel. The crosslinking agent can cause the polymer in separate layers to crosslink together so that the layers of hydrogel form a continuous crosslinked hydrogel network. This entire process can then be repeated for many more layers to build up a three-dimensional printed hydrogel object.

The fluid agents (i.e., the crosslinking agent, whitening agent, and coloring agent or agents) can be applied to the particulate build material using a variety of methods. In some examples, the agents can be jetted onto the build material using fluid jet print heads. The amount of crosslinking agent that is applied can be calibrated based on the concentration of crosslinker in the crosslinking agent, the desired degree of crosslinking for the three-dimensional printed hydrogel, and the desired water content for the hydrogel. When the crosslinking agent is jetted onto the build material using a fluid ejector, the amount of crosslinking agent applied can be controlled by ejecting a particular number of droplets of the crosslinking agent onto a particular area of the powder bed. This can be referred to as the contone level of jetting the crosslinking agent. In certain examples, the contone level can be controlled by selecting a number of droplets to print onto an area of the powder bed that is $1/600^{th}$ of an inch (42 μm) by $1/600^{th}$ of an inch (42 μm). The size of the droplets can be known in some examples. In certain examples, the droplet size can be from about 1 ng to 50 ng, or from about 5 ng to about 25 ng, or from about 6 ng to about 15 ng. In a particular example, the droplet size can be about 9 ng. The number of droplets printed onto the area of the powder bed can be from about 50 to about 100. The total amount of crosslinking agent applied to an area of the powder bed can affect the water content in the three-dimensional printed hydrogel. In certain examples, the contone level can be selected so that the water content of the hydrogel is from about 50 wt % to about 95 wt % based on the total weight of the hydrogel. In further examples, the water content can be from about 70 wt % to about 95 wt % or from about 80 wt % to about 95 wt %.

Similarly, the amount of whitening agent and/or coloring agent applied to the particulate build material can be adjusted depending on the desired level of whiteness, in the case of the whitening agent, or the desired hue and color saturation, in the case of the coloring agent. The concentration of white pigment or colorant in these agents can also be a factor in adjusting the amount of the agents to be applied. The whitening agent and coloring agent can also include water. Therefore, applying these agents can also impact the water content of the final three-dimensional printed hydrogel. In some examples, the total amounts of all fluid agents applied can be controlled to provide a desired water content in the three-dimensional printed hydrogel.

In some examples, the temperature of the powder bed can be controlled during three-dimensional printing. However, in other examples, the three-dimensional printing can be performed at ambient temperature without temperature control. The crosslinking agent can be applied to the polyhydroxylated swellable polymer at or near room temperature to form the hydrogel. In certain examples, the particulate build material can be at a temperature from about 0° C. to about 75° C. during three-dimensional printing of the hydrogel. In further examples, the particulate build material can be at a temperature from about 20° C. to about 50° C. or from about 30° C. to about 40° C. In another example, the particulate build material can be at a temperature of about 37° C. The crosslinking agent can also be maintained at a desired temperature so that the temperature of the particulate build material can be maintained during printing. In cases where the particulate build material is heated during three-dimensional printing, the heating can be accomplished with a heating lamp or lamps, an oven, a heated support bed, other types of heaters, or combinations thereof. In some examples, the entire powder bed can be heated to a substantially uniform temperature.

The three-dimensional printed hydrogel object can be formed to have a shape of a three-dimensional object model. Three-dimensional object models can in some examples be created using computer aided design (CAD) software. Three-dimensional object models can be stored in any suitable file format. In some examples, a three-dimensional printed hydrogel object as described herein can be based on a single three-dimensional object model. The crosslinking agent can be applied to areas of the particulate build material that correspond to layers or slices of the three-dimensional object model. Other information may also be included in three-dimensional object models, such as structures to be formed of additional different materials or color data for printing the object with various colors at different locations on the object. The three-dimensional object model may also include features or materials specifically related to jetting fluids on layers of powder bed material, such as the desired amount of fluid to be applied to a given area. This information may be in the form of a contone level or droplet saturation, for example, which can instruct a three-dimensional printing system to jet a certain number of droplets of fluid into a specific area. This can allow the three-dimensional printing system to finely control the amount of fluid agent applied to the particulate build material. All this information can be contained in a single three-dimensional object file or a combination of multiple files. The three-dimensional printed hydrogel object can be made based on the three-dimensional object model. As used herein, "based on the three-dimensional object model" can refer to printing using a single three-dimensional object model file or a combination of multiple three-dimensional object models that together define the object. For example, multiple individual object models can be prepared for portions of the three-dimensional printed hydrogel that will incorporate various different agents, such as the whitening agent and coloring agents described above. Alternatively, a single object model can include information about the locations where these various agents are to be applied. In certain examples, software can be used to convert a three-dimensional object model to instructions for a three-dimensional printer to form the object by building up individual layers of build material.

In an example of the three-dimensional printing process, a thin layer of particulate build material can be spread on a bed to form a powder bed. At the beginning of the process, the powder bed can be empty because no build material particles have been spread at that point. For the first layer, the particles can be spread onto an empty build platform. The build platform can be a flat surface made of a material such as a metal, glass, or plastic. Thus, "applying individual layers of a particulate build material to a powder bed" includes spreading particulate build material onto the empty build platform for the first layer. In other examples, a number of initial layers of particulate build material can be spread before the printing begins. These "blank" layers of particulate build material can in some examples number from about 0 to about 500, from about 10 to about 200, or from about 10 to about 100. In some cases, spreading multiple layers of powder before beginning the print can increase temperature uniformity of the three-dimensional printed hydrogel object. A fluid jet printing head, such as an inkjet print head, can then be used to print a crosslinking agent over portions of the powder bed corresponding to a thin layer of the three-dimensional printed hydrogel object. The crosslinking agent can include a crosslinker to crosslink the polymer in the particulate build material and water to be absorbed by the crosslinked polymer. This can form the first layer of hydrogel. After the first layer is formed, a new thin layer of particulate build material can be spread over the powder bed and the process can be repeated to form additional layers until a complete three-dimensional hydrogel object is printed. Thus, "applying individual layers of a particulate build material to a powder bed" also includes spreading layers of particulate build material over the loose particles and crosslinked hydrogel layers beneath the new layer of particulate build material.

When the three-dimensional printed hydrogel object is complete, the object can be removed from the powder bed. In certain examples, any loose particulate build material that remains in the powder bed can be recycled and used for future three-dimensional printing. In some cases, particles of the particulate build material can cling to the surfaces of the three-dimensional printed hydrogel object. These particles can be loosely adhered to the object without being crosslinked. In some examples, the adhered particles can be removed from the hydrogel object by brushing, blowing with compressed air, rinsing with water, or another method. In certain examples, the particulate build material can be a water-soluble polymer. Rinsing the hydrogel object with water can easily remove the adhered particles, as the particles can dissolve in the rinse water while the crosslinked hydrogel does not dissolve.

As mentioned above, the three-dimensional printed hydrogels made using the methods described herein can have a wide color gamut. In certain examples, the whitening agent can be used to make bright white portions of the hydrogel. Very dark colors are also achievable by using a dark colored coloring agent, such as a black coloring agent. At the same time, sections of the hydrogel can be left without any coloring agent or whitening agent, in which case the hydrogel can be colorless and translucent. The color gamut of the three-dimensional printed hydrogels can be expressed as a range of CIELAB values. The CIELAB color space expresses colors as a set of three values: $L^*$ represents the lightness from black (0) to white (100); $a^*$ represents colors from green (negative values) to red (positive values); and $b^*$ represents colors from blue (negative values) to yellow (positive values). In some examples, $a^*$ and $b^*$ can range from −100 to 100. The $L^*$, $a^*$, and $b^*$ values of a particular color can be measured using equipment such as an EXACT™ spectrophotometer from X-Rite (USA). In certain examples, the three-dimensional printed hydrogel can include the whitening agent, and the white color achieved can have an $L^*$ value in the range from about 85 to about 100. This represents a very bright white color, which can be brighter than whites achievable using some other three-dimensional printing processes. Dark blacks can also be achieved by using a black coloring agent. In some examples, the three-dimensional printed hydrogel can have a black color with an $L^*$ value from about 0 to about 20. The $a^*$ and $b^*$ values can also be close to 0, which corresponds to very neutral white and black colors (i.e., without a red, green, blue, or yellow color). In some examples, $a^*$ and $b^*$ of the color of the three-dimensional printed hydrogel can be from about −4 to about 4, or from about −4 to about 0, or from about −2 to about 2, or from about 0 to about 2. Additionally, coloring agents having other colors can be used during three-dimensional printing to provide bright colors other than white and black. When such coloring agents are used, the $a^*$ and $b^*$ values can vary in the range from −100 to 100 depending on the colors used and the amount of coloring agent applied.

Hydrogel Three-dimensional Printing Systems

The present disclosure also extends to hydrogel three-dimensional printing systems. The systems can include the particulate build material described above. The systems can also include fluid applicators to apply the crosslinking agent, whitening agent, and coloring agent to the particulate build material. In certain examples, the fluid applicators can be fluidly coupled or coupleable to the respective fluid agents. The fluid applicators can also be directable to iteratively apply the fluid agents to layers of the particulate build material. As explained above, the crosslinking agent can include water to swell the polyhydroxylated swellable polymer in the particulate build material. The crosslinking agent can also include a crosslinker that is reactive to crosslink hydroxyl groups of the polyhydroxylated swellable polymer. The whitening agent can include water and a dispersed white pigment. The coloring agent can include water and a colorant.

Figure 5:
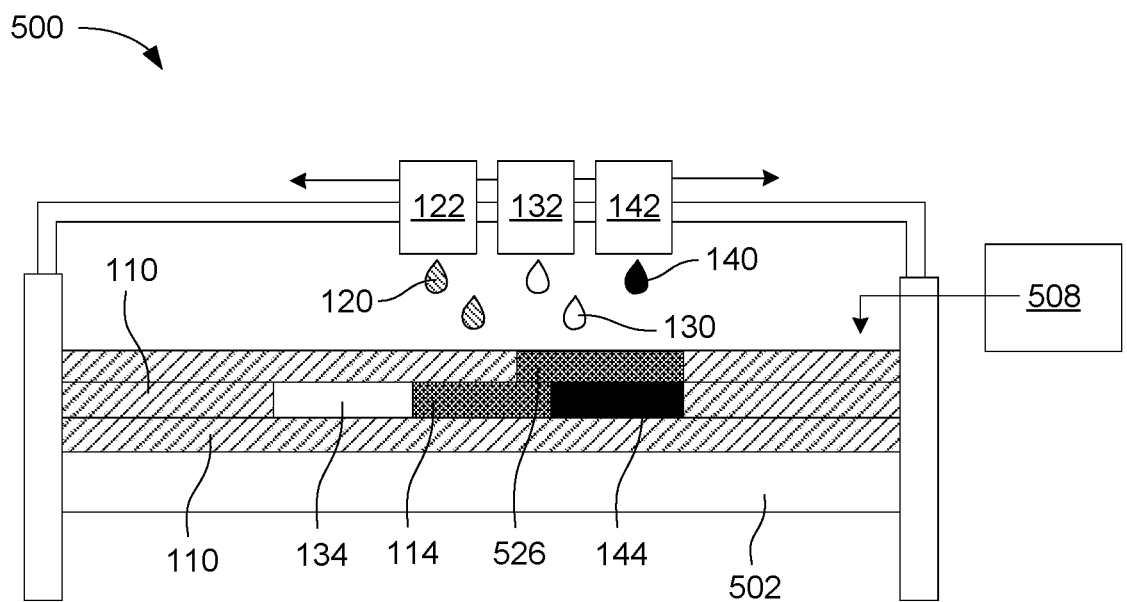
FIG. 5 is a schematic view of an example hydrogel three-dimensional printing system in accordance with examples of the present disclosure.

FIG. 5 shows an example hydrogel three-dimensional printing system 500 in accordance with the present disclosure. The system includes a build platform 502. Particulate build material 110 can be deposited onto the build platform by a build material applicator 508 where the particulate build material can be flattened or smoothed, such as by a mechanical roller or other flattening technique. This can form a flat layer of particulate build material. The crosslinking agent 120 can then be applied to the layer by a crosslinking agent ejector 122. The area 526 where the crosslinking agent is applied can correspond to a layer or slice of a three-dimensional object model. Additionally, a whitening agent 130 can be applied by a whitening agent ejector 132, and a coloring agent 140 can be applied by a coloring agent ejector 142. FIG. 5 shows a first layer of hydrogel 114 that has already formed. This layer includes a white area 134 and a colored area 144. An additional layer of particulate build material is also shown spread over the top. The system is in the process of applying the fluid agents to the additional layer to form another layer of hydrogel.

As used herein, "applying individual layers of particulate build material to a powder bed" can include applying the first layer of particulate build material that is applied directly to an empty support bed. The "support bed" can refer to the build platform, as shown in FIG. 5, for example. Additionally, in some examples, a layer or multiple layers of particulate build material can be laid on the support bed without jetting any crosslinking agent onto the layers. Accordingly, "applying individual layers of a particulate build material to a powder bed" can include applying a layer of particulate build material onto the initial layer or layers that may be applied without any crosslinking agent. The phrase "applying individual layers of a particulate build material to a powder bed" also includes applying to subsequent layers, when a layer or slice of the three-dimensional printed hydrogel object has already been formed in the layer below.

In further examples, the three-dimensional printing system can include a controller to direct the fluid agent applicators to apply the respective fluid agents to the individual layers of particulate build material. The controller can also direct other actions of the system, such as controlling the temperature of the powder bed, spreading additional layers of particulate build material onto the powder bed, and so on.

In further examples, the system can include a temperature control device such as a heater and/or temperature sensors for feedback. As mentioned above, the three-dimensional printing processes described herein can be performed at relatively low temperatures, such as from about 0° C. to about 75° C. In certain examples, the three-dimensional printing process can be performed at or near body temperature or another temperature that can be suitable for living cells. In some examples, the system can include a heat lamp or other heater over the powder bed. In other examples, a heater or multiple heaters can be positioned on a side or sides of the powder bed, or a combination of these locations. In some examples, the support bed can include an additional integrated heater to heat the powder bed from below to maintain a more uniform temperature in the powder bed.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" can include pigment colorants, magnetic particles, aluminas, silicas, and/or other ceramics, organo-metallics or other opaque particles, whether or not such particulates impart color. Thus, though the present description mentions pigment colorants, the term "pigment" can be used to describe pigment colorants and also other pigments such as organometallics, ferrites, ceramics, etc. In one specific aspect, however, the pigment is a pigment colorant.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the MASTERSIZER™ 3000 available from Malvern Panalytical (United Kingdom). The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Fluid Agent Formulations

A sample crosslinking agent was prepared by mixing the following ingredients. Sodium tetraborate was used as the crosslinker compound. The sodium tetraborate was included in an amount of 5.5 wt %. The crosslinking agent also included an organic co-solvent in an amount of 5.5 wt %, a surfactant in an amount of 0.8 wt %, and deionized water in an amount of 88.2 wt %.

A sample black coloring agent was prepared by adding a water-soluble black dye to the sample crosslinking agent. The composition of the black coloring agent included 1 wt % black dye, 5.5 wt % sodium tetraborate, 5.5 wt % organic co-solvent, 0.8 wt % surfactant, and 87.2 wt % deionized water. A sample whitening agent was also prepared, including a $TiO_2$ dispersion in an aqueous liquid vehicle.

Example 2—Three-Dimensional Printing Test

A three-dimensional printed hydrogel object was printed using the sample crosslinking agent, black coloring agent, and whitening agent of Example 1. The fluid agents were loaded into a test three-dimensional printer that included a powder bed and inkjet printheads for jetting the fluid agents onto the powder bed. The particulate build material used in the powder bed was a dry non-crosslinked polyvinyl alcohol powder. The layer height was set at 400 µm, meaning that when a fresh layer of particulate build material was spread on the powder bed, the upper surface of the layer was 400 µm higher than the previous layer. The amount of the fluid agents jetted onto the powder bed was varied between 50 and 100 droplets (having a weight of 9 ng per droplet) per square of $1/600^{th}$ inch by $1/600^{th}$ inch. This amount of fluid agent corresponded to a layer of liquid having a depth of 200-400 µm deposited onto the individual layers of particulate build material.

It was found that when the crosslinking agent was jetted onto a layer of particulate build material, the polyvinyl alcohol absorbed the water in the crosslinking agent and swelled to a greater volume. This caused the layer height to increase. When the next layer of dry particulate build material was spread over the powder bed, there was less space over swelled area, so that amount of powder added over that area in particular was less than 400 µm deep. In some cases, there was space for about 40 µm of additional particulate build material over the top of the swelled area.

The three-dimensional printed hydrogel object was a rectangular block having a white section, a translucent section, and a black section. The transparent section was formed by jetting the crosslinking agent without any whitening agent or coloring agent. The black section was formed by jetting the black coloring agent. The black coloring agent formulation included the sodium tetraborate crosslinker, so the black coloring agent was sufficient to crosslink the polyvinyl alcohol without jetting the crosslinking agent in the same area. The whitening agent did not include the crosslinker, so the white section was formed by jetting both the whitening agent and the crosslinking agent.

After printing the hydrogel rectangular block, the block was removed from the powder bed and rinsed with deionized water to remove any adhered polyvinyl alcohol particles. The block had three visibly distinct sections, including an opaque white section, a translucent section, and a black section. The white and black sections were analyzed using EXACT™ spectrophotometer from X-Rite (USA). The values for $L^*$ and $b^*$ were measured. Several measurements were taken in the white and black regions. In the white region, the $L^*$ values ranged from 85 to 90 units and the $b^*$ values ranged from 0 to 2 units. This corresponds to a high whiteness level. For the black region, the $L^*$ values were below 10 units. This corresponds to a very dark black color. These values are better than those achieved using certain thermal three-dimensional printing processes that involve using heat to fuse a polymer powder build material. These thermal processes often provide $L^*$ values in the range of 70 to 80 units and $b^*$ values in the range of $-4$ to 0 units for the whitest achievable white color. The thermal processes often provide $L^*$ values in the range of 30 to 40 for black colors. Thus, the methods described herein can provide lighter whites and darker blacks than certain other three-dimensional printing processes.

What is claimed is:

1. A hydrogel three-dimensional printing kit comprising:
a particulate build material comprising a polyhydroxylated swellable polymer;
a crosslinking agent comprising water and a crosslinker that is reactive with hydroxyl groups of the polyhydroxylated swellable polymer to crosslink the polyhydroxylated swellable polymer;
a whitening agent comprising water and a dispersed white pigment; and
a coloring agent comprising water and a colorant.

2. The hydrogel three-dimensional printing kit of claim 1, wherein the whitening agent and the coloring agent also include the crosslinker.

3. The hydrogel three-dimensional printing kit of claim 1, wherein the colorant is a black dye, a cyan dye, a magenta dye, a yellow dye, a red dye, a blue dye, a green dye, a violet dye, an orange dye, a brown dye, or a combination thereof.

4. The hydrogel three-dimensional printing kit of claim 1, wherein the white pigment comprises titanium dioxide.

5. The hydrogel three-dimensional printing kit of claim 1, wherein the particulate build material is devoid of pigment.

6. The hydrogel three-dimensional printing kit of claim 1, wherein the polyhydroxylated swellable polymer comprises polyvinyl alcohol, cellulose, gelatin, alginate, chitosan, poly (2-hydroxyethyl acrylate), poly(2-hydroxyethyl methacrylate), poly(acrylic acid), poly(methacrylic acid), poly(N,N-dimethylacrylamide), poly(N,N-diethylacrylamide), poly (N-isopropylacrylamide), or a combination thereof.

7. The hydrogel three-dimensional printing kit of claim 1, wherein the crosslinker comprises boric acid, a boric acid salt, citric acid, a citric acid salt, succinic acid, a succinic acid salt, cationic calcium, cationic barium, or a combination thereof.

8. A method of three-dimensional printing a hydrogel comprising:
    iteratively applying individual layers of a particulate build material to a powder bed, wherein the particulate build material comprises a polyhydroxylated swellable polymer;
    based on a three-dimensional object model, iteratively and selectively applying a crosslinking agent onto the individual layers, wherein the crosslinking agent comprises water and a crosslinker, wherein the water swells the polyhydroxylated swellable polymer and the crosslinker reacts with hydroxyl groups of the polyhydroxylated swellable polymer to crosslink the polyhydroxylated swellable polymer, thereby forming a three-dimensional printed hydrogel;
    iteratively and selectively applying a whitening agent onto the individual layers, wherein the whitening agent comprises water and a dispersed white pigment; and
    iteratively and selectively applying a coloring agent onto the individual layers, wherein the coloring agent comprises water and a colorant.

9. The method of claim 8, wherein the particulate build material is at a temperature from about 0° C. to about 75° C. during three-dimensional printing of the hydrogel.

10. The method of claim 8, wherein the three-dimensional printed hydrogel includes a white surface area comprising the white pigment, wherein the white surface area has an $L^*$ value from about 85 to about 100.

11. The method of claim 8, wherein the colorant is a black dye, wherein the three-dimensional printed hydrogel includes a black surface area comprising the black dye, wherein the black surface area has an $L^*$ value from about 0 to about 20.

12. A hydrogel three-dimensional printing system comprising:
    a particulate build material including a polyhydroxylated swellable polymer;
    a crosslinking agent applicator fluidly coupled or coupleable to a crosslinking agent, wherein the crosslinking agent applicator is directable to iteratively apply the crosslinking agent to layers of the particulate build material, wherein the crosslinking agent comprises water to swell the polyhydroxylated swellable polymer and a crosslinker that is reactive to crosslink hydroxyl groups of the polyhydroxylated swellable polymer;
    a whitening agent applicator fluidly coupled or coupleable to a whitening agent, wherein the whitening agent applicator is directable to iteratively apply the whitening agent to layers of the particulate build material, wherein the whitening agent comprises water and a dispersed white pigment; and
    a coloring agent applicator fluidly coupled or coupleable to a coloring agent, wherein the coloring agent applicator is directable to iteratively apply the coloring agent to layers of the particulate build material, wherein the coloring agent comprises water and a colorant.

13. The system of claim 12, wherein the white pigment comprises titanium dioxide and wherein the colorant is a black dye, a cyan dye, a magenta dye, a yellow dye, a red dye, a blue dye, a green dye, a violet dye, an orange dye, a brown dye, or a combination thereof.

14. The system of claim 12, wherein the polyhydroxylated swellable polymer comprises polyvinyl alcohol, cellulose, gelatin, alginate, chitosan, poly(2-hydroxyethyl acrylate), poly(2-hydroxyethyl methacrylate), poly(acrylic acid), poly (methacrylic acid), poly(N,N-dimethylacrylamide), poly(N,N-diethylacrylamide), poly(N-isopropylacrylamide), or a combination thereof and wherein the crosslinker comprises boric acid, a boric acid salt, citric acid, a citric acid salt, succinic acid, a succinic acid salt, cationic calcium, cationic barium, or a combination thereof.

15. The system of claim 12, wherein the particulate build material is devoid of pigment.

\* \* \* \* \*